April 9, 1929. H. E. BOYRIE 1,708,653

FLUID SEPARATOR

Filed June 24, 1925

INVENTOR:
Harry E. Boyrie
BY
ATTORNEY.

Patented Apr. 9, 1929.

1,708,653

UNITED STATES PATENT OFFICE.

HARRY E. BOYRIE, OF SAN FRANCISCO, CALIFORNIA, ASSIGNOR, BY MESNE ASSIGNMENTS, TO BLAW-KNOX COMPANY, OF BLAWNOX, PENNSYLVANIA, A CORPORATION OF NEW JERSEY.

FLUID SEPARATOR.

Application filed June 24, 1925. Serial No. 39,201.

This invention relates to fluid separators and particularly to an improved method of separating liquids from gases when foam is present, or which, for other reasons, are of such a nature as to be incapable of complete separation from the gases by means of certain types of separators. The particular application of the invention which I illustrate and describe herein is to the separation of moisture from steam, particularly with foaming boilers. It is to be understood, however, that other applications of the invention may be made. The objects of the invention will be apparent from a consideration of the accompanying drawings and the following description thereof.

Figure 1:
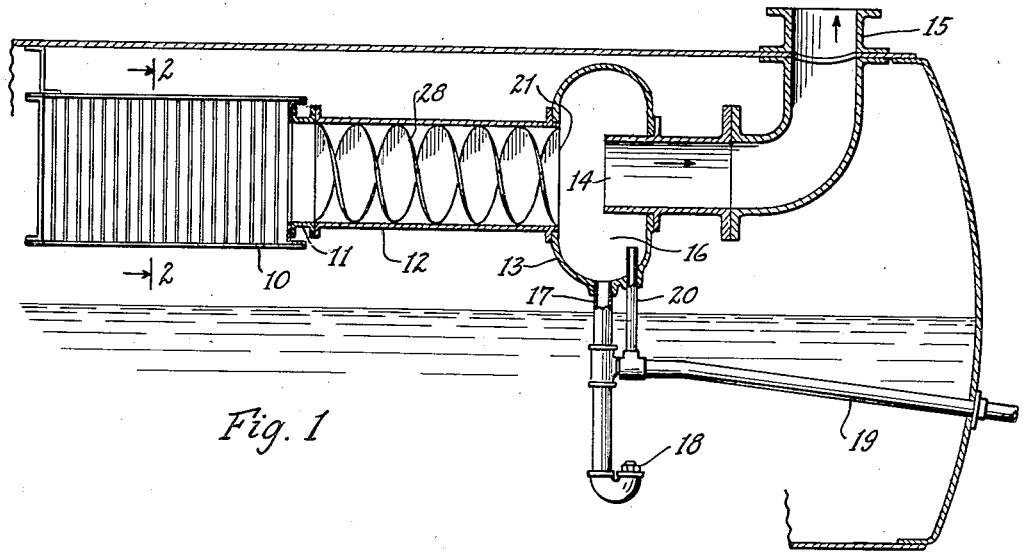
Figure 2:
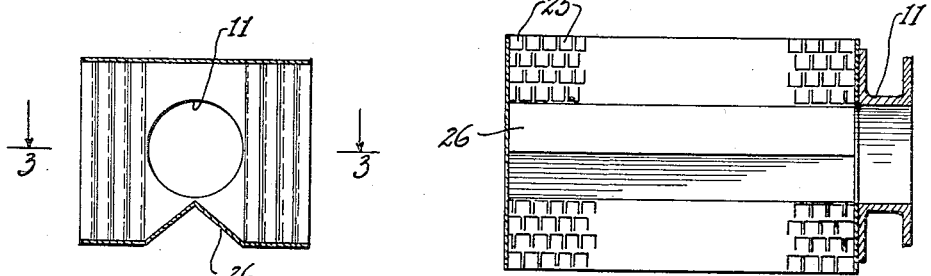
Figure 3:
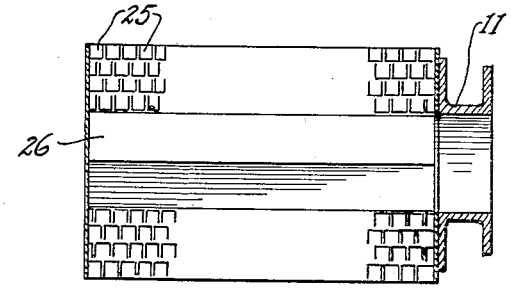
Figure 4:
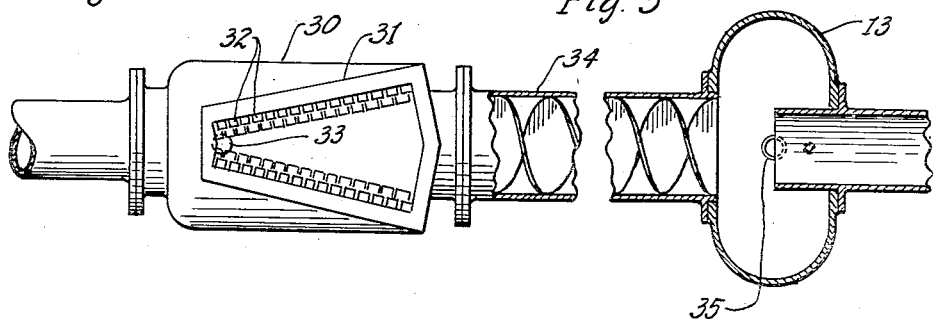

Of the accompanying drawings Fig. 1 is an elevation of a steam separator which embodies the features of my invention, the separator being mounted in a boiler and certain portions of the drawing being in section; Fig. 2 is an enlarged sectional view of the separator along the line 2—2 of Fig. 1; Fig. 3 is a sectional plan view along the line 3—3 of Fig. 2; and Fig. 4 is a plan view partly in section of a modified form of the separator used outside of the boilers.

When there is foaming of the water in the boiler so that the space above the water level is partly filled with bubbles, and a separator is used in the boiler, it has been found that a good portion of the bubbles will pass through certain types of separators without being broken up and hence without being separated from the steam. This is particularly true when a contrifugal type of separator is used. I have discovered that this is because there is little tendency of such separators to break the bubbles as they pass through, and that, by using proper means for breaking up the bubbles before they pass in to the centrifugal separator, or while they are passing through, the effectiveness of the separator is greatly increased. My improved method, therefore, consists in suitably breaking up the bubbles, or other masses of moisture, into discrete particles before passing them into the centrifugal separator.

The means which I prefer for carrying out this method of separation comprises a carton of baffles 10 which is adapted to break up the bubbles or drops of water. This carton of baffles may itself have separating functions, and for convenience may be called the first separator. From these baffles the moist steam passes into an outlet 11, the outlet registering with the inlet of a second separator, which, in this instance, is of the centrifugal type. From this centrifugal separator the steam and moisture pass into a chamber 13 which may be designated as a water collector. In this chamber there is a steam outlet 14, and, from this outlet, the steam passes to the steam main 15 of the boiler and thence to the turbines or other machines. In the lower portion of the collector 13 is a chamber 16 into which the water passes as it is separated from the steam; and connected with this chamber is a drain pipe 17. The separated water passing into the drain pipe may pass, through a check valve 18, back into the boiler; or, under certain conditions, it may pass out of the boiler through a drain pipe 19, and into a steam trap, or elsewhere is may be desired. A vent pipe 20, connecting the pipe 19 with the chamber 16, prevents clogging up of the drain pipe by relieving the back pressure and allowing any air or steam which may be entrained in the water to pass back to the water collector.

Any suitable type of baffles may be used in the first separator for breaking up the bubbles. I prefer for the purpose a carton of baffles somewhat similar to those illustrated and described in the Patent No. 1,336,870 issued to H. H. Tracy on April 13, 1920. This patent illustrates a very common type of baffle, and comprises four rows of trough-shaped baffles 25, the baffles in one row being staggered with reference to the baffles in the next row, and the baffles being positioned with the open sides extending outwardly so that the bubbles are driven vigorously into the open sides of the baffles and dashed against the surfaces thereof. By materially reducing the size of these baffles and the spaces between them as compared with the ordinary types of baffles, the steam passes through the carton of baffles at a very high velocity and the bubbles are thus crushed and broken against the sides, so that the steam passing out of the outlet 11 is free from bubbles. A portion of the moisture from these bubbles, or which is in the steam in the shape of particles of moisture, is separated from the steam while passing through these baffles and flows back into the boiler water, drain plates 26 being provided to drain this moisture from the cartons and to cause it to flow back into the boiler.

If desired this first separator may be fitted with a drain pipe and check valve somewhat similar to 17, 18, 19 and 20 of Fig. 1 to drain the separated water either interiorly or exteriorly, or both.

Any suitable type of secondary separator may be used for completely separating the moisture from the steam after it has passed through the bubble-breaking separator 10. I prefer for the purpose the centrifugal separator 12.

This comprises spiral-shaped conduits 28, so arranged that the steam and moisture, as it passes through, is given a rotary forward movement; and as it passes out of the outlet 12, the moisture, being denser, is thrown outwardly along the inner surfaces of the water chamber and passes down into the collecting chamber 16, while the steam is forced out of the collector through the outlet 14.

It will be understood that additional separators may be used, either in parallel with these and connected to the same steam outlet of the boiler, or, if desired, a plurality of separators may be placed in series so as to increase the effectiveness of the separation or so as to provide greater capacity of the separator by increasing the cross-sectional area through which the steam can enter the separator.

In use the operation of the apparatus is obvious from the description hereinabove given. The drainage system of the secondary or centrifugal separator is so arranged that, when but little steam is taken from the boiler, the speed and consequently the drop in pressure through the separator, will be low, and the height of the water in the vertical drain pipe 17 will be sufficient to force open the check valve and allow the water to drain back into the boiler. But with increased loads, and increased speeds of the steam, the drop in pressure becomes so high that the check valve is held closed, and the drainage water passes out through the pipe 19 to a trap or other device for the removal of water. The system, therefore, automatically provides for passing the water into the boiler when there is little or no foaming and out of the boiler when the foaming is material, it being understood that foaming ordinarily increases with the load on the boiler.

Another object in draining the separated water exteriorly of the boiler during foaming periods is that its replacement by fresh water may reduce the concentration of water in the boiler and lessen the foaming to a degree where it is within the capacity of the separator to deliver dry steam.

Although I have illustrated a separator as used within the boiler, it should be understood that one may be used outside of the boiler in a suitable manner. For this purpose I prefer to insert in the main steam pipe 15 of the system a casing 30 in which is mounted a separator 31 arranged with its inlet sides tapering so that the steam can enter the separator through the baffles 32 mounted in the opposite sides of the casing. The water which is separated from the steam in this case passes down to the bottom of the separator and out through the outlet 33, to a steam tank. The steam, with the remaining portion of the moisture, then passes into the centrifugal separator 34 which is in series with the bubble-breaking separator 31, and the moisture is separated from the steam in substantially the same manner as is the case with the separator inserted in the boiler, the drainage water passing out through the drain pipe 35.

I claim as my invention:

1. A centrifugal steam separator having a water collector, a steam conduit having an inlet positioned in the central portion of said collector, a water conduit connected with the bottom of said collector, a check valve mounted in said water conduit, a drain pipe connected to said conduit between said valve and said collector, and a vent pipe connecting said drain pipe with said collector.

2. A steam separator having a steam inlet and a steam outlet, transverse baffles mounted in said inlet, means in said conduit between said inlet and outlet for imparting a rotary movement to said steam, a drain pipe in said conduit between said means and said outlet, said conduit being adapted to be mounted in a boiler; a check valve in said drain pipe, and a second drain pipe connected to said first mentioned pipe between the check valve and the conduit.

In testimony whereof, I hereunto set my hand.

HARRY E. BOYRIE.